No. 744,669. PATENTED NOV. 17, 1903.
B. ZWILLINGER.
PROCESS OF CARBONIZING AND COOLING DOWN THE CHARGE.
APPLICATION FILED FEB. 24, 1902. RENEWED JUNE 5, 1903.
NO MODEL.
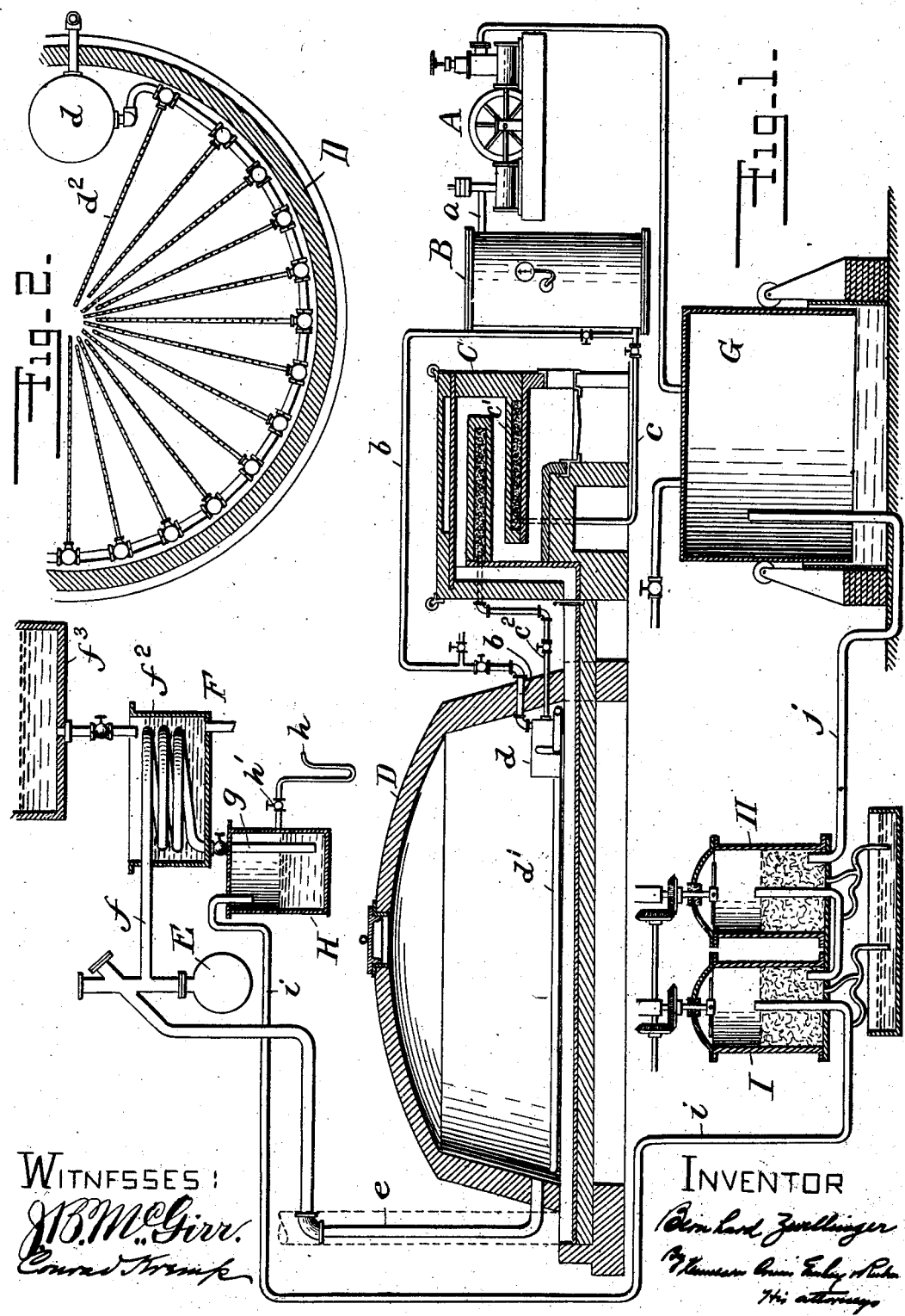
WITNESSES:
INVENTOR No. 744,669. Patented November 17, 1903.

UNITED STATES PATENT OFFICE.

BERNHARD ZWILLINGER, OF NEW YORK, N. Y., ASSIGNOR, BY MESNE ASSIGNMENTS, TO AMERICAN FUEL AND DISTILLATION COMPANY, A CORPORATION OF NEW JERSEY.

PROCESS OF CARBONIZING AND COOLING DOWN THE CHARGE.

SPECIFICATION forming part of Letters Patent No. 744,669, dated November 17, 1903.

Application filed February 24, 1902. Renewed June 5, 1903. Serial No. 160,265. (No specimens.)

*To all whom it may concern:*

Be it known that I, BERNHARD ZWILLINGER, a citizen of the United States, residing in the borough of Manhattan, city, county, and State of New York, have invented certain new and useful Improvements in Processes of Carbonizing and Cooling Down the Charge, of which the following is a specification.

My invention relates to processes of carbonizing solid materials and rapidly cooling down the charge after carbonization has been effected.

In order that my invention may be fully understood by those skilled in the art, I will proceed to describe one mode of carrying out the same and the apparatus capable of carrying out the said process. It will be understood, however, that I do not limit myself to the process set forth, as the process may be practiced otherwise than with the apparatus shown in the drawings. Heretofore in charcoal-kilns it has been customary after carbonization of the wood has been effected to close all the openings of the kiln and to allow the charge to slowly cool down. This process required from seven to nine days to effect a proper cooling of the charcoal so that the same could be taken out of the kiln without being attacked by the air and burning up. It has also been proposed to cool down the charge by the employment of water. This expedient, however, is impracticable for the reason that the water on coming in contact with the hot glowing charcoal would have the effect of causing the same to partially break and to in some degree become saturated with water, which is detrimental, in that this water must afterward be driven off, causing a loss of heat. It has also been proposed to cool down kilns by cooling the walls or bottom thereof.

My present process differs from the other processes and may be briefly stated as embodying for its essential feature a cooling-down step whereby the charge is cooled by the action of mechanically-propelled cooled permanent gases, which gases may either be the products of the carbonization of the charge or else may be inert gases of any desired character.

My invention is principally valuable for use with large kilns containing, say, one hundred and thirty thousand to two hundred thousand pounds of wood; but it is to be understood that while the process is principally valuable in connection with kilns handling large bodies of wood or other carbonizable material nothing herein contained shall be construed as limiting the application of this invention to kilns of large capacity.

In the accompanying drawings I have shown in Figure I, diagramatically for the most part, an apparatus adapted to carry out my improved process, and in Fig. II I have shown a plan view of the system of pipes preferably employed on the floor of the kiln.

A represents an air-compressor which delivers gases into an accumulator B. The gases are derived from the gasometer G by the air-compressor.

C is a suitable heater, which is preferably employed, as will be explained, although it will be understood that I do not limit my invention to any given type of carbonizing apparatus.

D is the kiln, which may be of any suitable or preferred construction. In the present instance it is shown as of a general dome shape and provided with a distributer $d$, by which permanent gases are received and distributed to suitable pipes on the floor of the kiln. These pipes are perforated and consist, preferably, of a pipe $d'$, running circumferentially of the kiln and having branches $d^2$, which extend inwardly toward the center of the kiln radially thereof. The air-compressor A is connected by pipe $a$ with the accumulator B. This accumulator B is shown in the present instance as connected by pipe $c$ with the coil $c'$ of the heater, which is in turn connected by pipe $c^2$ with the pipe system in the kiln. Suitable valves are provided for shutting off the heater at the appropriate time. The accumulator B is also connected by pipe $b$ with the drum or distributer $d$ in the kiln. It will be understood that the compressor A forces the inert or permanent gases through the accumulator B, thence by pipes $b$ into the kiln D, whence the gases pass by the pipe $e$ to a suitable hydraulic main E, if desired, and thence the gases pass by a pipe $f$ to a suitable condenser and cooler F. This condenser and cooler is shown in the present instance as embodying a tank containing a coil $f^2$ and adapted to receive a circulation of water or other cooling liquid from tank $f^3$, it being understood, however, that the illustration is more or less diagrammatic and that no attempt has been made to accurately show the proportions of the various parts, it being within the skill of a skilful mechanic to properly proportion the various parts one to the other to obtain the best results. From the condenser F the cooled gases pass by the pipe $g$ into a suitable collecting vessel H on the principle of the well-known or Wulff bottle, which may be provided with a siphon $h$, having a suitable cock $h'$, which cock is closed during the normal operation of the cooling process. From the collecting vessel H the gases pass by pipe $i$ to the scrubbers I II. These scrubbers are of any desired or preferred construction capable of removing from the permanent gases the last traces of tar and tarry products. From the scrubbers the gases pass into the gas-holder or gasometer G by the pipe $j$.

In carrying out the process the wood or other solid substance is first carbonized in the kiln D, and when the carbonization is completed the process of cooling down begins. In the drawings I have shown a heater C, which may be used in combination with the kiln to bring thereto a supply of heated permanent gases for use in the carbonizing process. For this purpose the pipe $c$ is employed and the valves are so manipulated that the pipe $b$ is out of service. It will be understood, however, that any desired process of carbonization may be employed. During the process of carbonization when the heater is employed and gases are blown through the apparatus the permanent gases—the products of the carbonization—are after the separation from the liquid substances has been effected collected in the gasometer G. When the carbonization has been completed, the flow of hot permanent gases is suspended and the cooling-down process begins. For this purpose the pipe $c$ is put out of action and the pipe $b$ is put in action. By this means the permanent gases from the compressor are first caused to pass through the accumulator B, thence through the pipe $b$ to the kiln, where they are properly distributed, to the mass of material in the kiln, passing upward through the same, taking up the heat from the hot mass, which has thereby cooled down proportionately, and are thereupon passed by the pipe $e$ to the hydraulic main and thence to the condenser, where the gases are cooled, and thence pass through the vessel H, and thence by the pipe $i$ to the scrubbers I II, depositing there the last traces of their tar and tarry residues. The gases thence pass by the pipe $j$ to the gasometer G, from which they may be sucked by the air-compressor A. It will be thus seen that the cooled gases are circulated by the air-compressor, taking up and removing the heat units from the carbonized charge, are cooled and again continuously traverse their circuit until the carbonized mass has been cooled down to the desired degree, which will be shown by the pyrometer used in connection with the kiln. By thus proceeding I am enabled to cool down a charge of carbonized material with great rapidity, and while it is impossible to state the results which would be achieved under any given set of circumstances I may state that instead of employing from seven to nine days, as was heretofore necessary when kilns were simply allowed to cool by themselves, the time of cooling a charge of, say, forty thousand to fifty thousand pounds of charcoal—the product of the carbonization of about one hundred and sixty thousand to two hundred thousand pounds of wood—has been reduced by me to one day or less.

The advantages of my process are very numerous and very great. To begin with, by reducing the time necessary to cool down a charge of charcoal kilns can be employed oftener, and consequently greater duty obtained from any given kiln. Second, by reducing the time of cooling down the time when the next charge can be inserted will be correspondingly shortened and a certain amount of the heat in the heater saved for the next operation of carbonization, it being readily understood that, as the heater cools down slowly and the kiln is cooled down very rapidly, a very large amount of coal can be saved by reason of the fact that the heater will retain a considerable portion of the stored-up heat. Consequently with any given plant the output can be very materially increased, and as a less number of kilns can be employed to do the work of a much greater number of kilns the amount of capital tied up in any given carbonization plant can be greatly reduced.

Having described my invention, what I claim, and desire to secure by Letters Patent, is—

1. The herein-described process of producing carbonized substances, which consists in initially carbonizing the said substances and subsequently, while the charge is still hot, continuously subjecting it to the action of mechanically-propelled cooled gases free of uncombined oxygen, in a greater quantity than the capacity of the carbonized substances for absorption after cooling and at atmospheric pressure, whereby the charge may be cooled down in a rapid and efficient manner.

2. The herein-described process of producing carbonized substances, which consists in initially carbonizing the said substances and collecting and storing the permanent gases derived therefrom, and subsequently while the charge is still hot continuously subjecting it to the action of mechanically-propelled cooled gases free of uncombined oxygen in a greater quantity than the capacity of the carbonized substances for absorption after cooling and at atmospheric pressure, whereby the charge may be cooled down in a rapid and efficient manner.

BERNHARD ZWILLINGER.

Witnesses:
  CONRAD KREMP,
  GEO. E. MORSE.